(12) United States Patent
Pelly et al.

(10) Patent No.: US 6,510,532 B1
(45) Date of Patent: Jan. 21, 2003

(54) BUS AND/OR INTERFACE LOCAL CAPTURE MODULE FOR DIAGNOSTIC ANALYZER

(75) Inventors: Simon James Pelly, Bristol (GB); Lynne Haper, Swinden (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/417,574

(22) Filed: Oct. 14, 1999

(30) Foreign Application Priority Data

Oct. 15, 1998 (EP) .............................. 98308424

(51) Int. Cl.⁷ ................................. H02H 3/05
(52) U.S. Cl. ..................... 714/43; 714/44; 710/15; 710/18
(58) Field of Search .................... 714/43, 44, 27; 710/15, 16, 17, 18, 19, 313, 314, 315

(56) References Cited

U.S. PATENT DOCUMENTS

| | | | | |
|---|---|---|---|---|
| 4,951,283 A | * | 8/1990 | Mastrocola et al. | 714/43 |
| 5,613,074 A | * | 3/1997 | Galloway | 326/30 |
| 5,619,728 A | * | 4/1997 | Jones et al. | 710/10 |
| 5,796,938 A | | 8/1998 | Emberty et al. | |
| 5,923,673 A | * | 7/1999 | Henrikson | 714/43 |
| 6,098,120 A | * | 8/2000 | Yaotani | 703/25 |
| 6,112,316 A | * | 8/2000 | Porterfield | 16/DIG. 24 |
| 6,141,757 A | * | 10/2000 | Seeker et al. | 713/200 |
| 6,345,370 B1 | * | 2/2002 | Kwon | 714/44 |

FOREIGN PATENT DOCUMENTS

| | | |
|---|---|---|
| DE | 19753455 A1 | 12/1996 |
| EP | 0403207 A2 | 6/1990 |

* cited by examiner

*Primary Examiner*—Robert Beausoleil
*Assistant Examiner*—Yolanda L. Wilson (57) ABSTRACT

A localized bus and/or interface condition capture module (26, 26) is incorporated at the interface (24, 34) of a bus (21) with a peripheral device (22,32), for example embedded in an interface ASIC (41), discretely to track locally bus and/or interface signal condition, and the operational state or phase of an associated peripheral device, for subsequent access, remote analysis and diagnosis.

7 Claims, 8 Drawing Sheets

BUS AND/OR INTERFACE LOCAL CAPTURE MODULE FOR DIAGNOSTIC ANALYZER

BACKGROUND OF THE INVENTION

For coherent and consistent operation, a data and command bus between otherwise disparate or independent remote elements—required to interact through exchange of data, interrogation and command or instructions—generally follows a prescribed behaviour pattern or protocol.

Protocol

The term 'protocol' is used herein to embrace a regime, or rule set, for regulating—in relation to communications traffic over a data highway or pathway—the nature of interconnection or interface, the manner of interaction, and the content of information, interrogation or command, in data exchange or transfer elements or modules.

A protocol can adopt and prescribe various operational rules and standards—to which all physical connections with, and modes of communications over, the highway must defer, conform and adhere.

Thus, so-called SCSI and PCI, represent examples of common contemporary protocols for (parallel) bus configuration.

Bus

The term 'bus' is used herein to embrace any form of communications channel, data highway or pathway, particularly, but not exclusively, of a parallel, or multiple simultaneous, channel or line character or configuration.

That said, aspects of the invention may be applicable to other, for example serial, bus configurations.

Generally, a bus is a transmission line, commonly expressed or embodied as a hardware signal path, of physical conductors, whether (umbilical) cables or printed circuit board (PCB) conductor strips.

As such, a bus could find diverse application from, say, vehicle electrical supply engine, transmission and brake monitoring and command multiplex wiring harness, through to personal computers.

Hardware aside, a bus could be interrupted—or even part—constituted by—intermediate radio, optical fibre or infra-red links, provided an electrical signal can physically be picked up at some point (eg of bus termination).

Interface

Interaction between a bus, a primary command and control processor or central processing unit (CPU) and a (peripheral) device is through an interface—which itself must adhere to the bus protocol, but which enables physical (impedance or load) matching of otherwise incompatible elements, to allow converse therebetween.

The term 'interface' is used herein to embrace an interconnection, principally by physical interaction, with a bus.

(Interface) ASIC

It is common to use a dedicated or bespoke (semiconductor) device configuration, such as an ASIC (Application Specific Integrated Circuit), in an interface between a bus and a peripheral device.

Such a 'dedicated' ASIC is then instrumental in controlling interactions between a peripheral and the bus—and, in particular, (when the protocol so allows) in a peripheral 'asserting' and 'de-asserting' temporary control over the bus, as discussed later.

Some aspects of the present invention are concerned with supplementing, enhancing or reinforcing the use of such an interface ASIC, with additional functionality and memory, intimately to address local conditions:

at the driver output of the ASIC; and
input of the ASIC.

Bus or Interface Protocol

A bus or interface protocol commonly embraces various features of hardware and software. As such, a protocol may dictate or prescribe signal levels, or ranges, and allocate particular significance to certain signal sequences, or combinations.

According to bus or interface configuration, the protocol may also allocate particular (control) functions to certain individual signal lines or channels, or select multi-channel combinations.

Generally, a given bus protocol prescribes intended or envisaged 'allowable', or correct, bus instantaneous signal level conditions, on individual bus lines.

However, the protocol may not be overly specific upon allowable departures from recommended or set levels—and so upon what would constitute an 'error' or fault condition, (and as such one in need of correction or resolution), as discussed later.

A protocol may also define signal level transitions, or changes, and sequences. Regard might also be paid to the cumulative or combinatorial effect of signal levels.

Some, but not all, protocols may allow different peripheral devices temporarily to take command and control over, or to 'assert' the bus.

Should an error or fault condition arise, as described later, it is important to know (in a bus which so allows) which (peripheral) device is asserting the bus at the time, in order to pin-point the source of 'deviant' behaviour.

Some form of local error monitoring capability—as provided by aspects of the present invention, discussed later—is particularly advantageous when the protocol allows such peripheral device assertion.

Interrupt signals on the bus could preface hand-over and hand-back signal sequences, passing the bus over to other peripheral devices, or back to a centralised command CPU. Indeed in practice, in a computer system, the peripheral device(s) might well occupy more time cumulatively in charge of the bus than the CPU itself.

Hence the value of knowing which device is actively 'asserting' and which device(s) are 'passive' at any sampling instant. When not asserting the bus, a peripheral device is free to receive signals from, or to interrogate, signals upon the bus.

Generally, a device state will reflect signals detected on the bus, through an associated device interface.

In considering the interaction between a peripheral and the bus, separate or individual consideration must be given to:

the outflow of signal directives—in a bus 'assertion' or driving mode; and the inflow of signals from the bus—in a passive reception or driven mode.

The passive mode is significant, since the peripheral can be commanded to change operational state or condition, in response to perceived bus signal changes.

Missed, or wrongly interpreted, bus signals can lead to a missed or skipped device state change and consequent disruption of device operational sequence in synchronism with the bus—and attendant degradation in peripheral performance.

Physically, there is a unique common point or node location, from or at which both outgoing and incoming signals may be encountered—for analysis of bus interactions and bus read-write errors associated with that peripheral.

A conventional self-contained bus analyser connected at a remote location (from the peripheral and its associated interface), simply cannot address or map that critical interface input-output node, which will enjoy an unique signal level profile.

Nor can a conventional bus analyser determine directly the operational state or phase of individual peripheral devices.

Thus bus signal condition—upon which a conventional bus analyser is critically dependent—is not uniform throughout the bus. Nor is bus signal condition necessarily indicative, either of local interface signal condition (for any given peripheral), or of the operational state of that peripheral.

The diagnostic ability of a conventional bus analyser is thus constrained—and inadequate for a complete diagnostic role.

Moreover, since a bus is effectively a transmission line, with inherent (characteristic) impedance losses throughout, it follows that relative 'downstream' or 'upstream' bus tappings cannot replicate a localised approach—as envisaged with aspects of the present invention. Nor can a remote bus analyser recognise state changes of individual peripherals.

Thus part of the performance—and thus error—mapping is incomplete, and so potentially inadequate, in the conventional remote error signal capture and diagnostic approach.

As a transmission line, the bus access interfaces and terminations can prove critical. Thus bus loads must be matched to the bus transmission line characteristics, for effective signal energy transfer. Mis-matching can lead to spurious signal reflections or echoes and attendant interpretation errors and disruption. Matching an external bus analyser to a bus can be problematic.

The character or nature and extremity or degree of errors that can be tolerated by a bus protocol is not generally well-specified. Not all protocol interpretations by peripherals, or indeed the bus construction or CPU themselves, are uniformly consistent or 'robust'.

It can be difficult to determine which errors will lead to total and non-recoverable bus failure and which to continual minor disruption, such as might trigger repeated automatic bus condition resets. Whilst a certain fault-tolerance can be built into the protocol, a tight or well-specified protocol may generally be less tolerant to errors or deviations from standard.

Deference to and compliance with protocol is a pre-requisite of stable performance. That said, departure or deviation from the protocol, however arising, disrupts data transfer and impedes performance of peripheral devices. Yet such irregularity can be difficult to identify. Moreover, with multiple inter-connected devices, the location of faults can be difficult to pin-point.

An interface standard, such as SCSI, requires a recognition of the current phase of the operational protocol and a knowledge of how to (re-)act accordingly, from current bus signals.

With multiple peripheral devices, (inter) connected through a common bus, differences in interpretation of the (say, SCSI) bus or interface protocol specification and consequently implementation of decision logic can cause problems.

Software aside, hardware problems can also arise from essentially physical factors, such as sporadic 'glitches', unsatisfactory terminations or location of peripherals—any of which can affect the perception of bus signals.

Testing and de-bugging tools, such as proprietary self-contained (SCSI) bus (interface) analysers, are typically employed to review system performance from 'silicon turn-on', through functional or product testing, to overall system integration.

In principle, by connection to the bus, such an analyser should act as a 'passive' observer, to capture information upon signal edge change or level transition and as such is useful in low level hardware and chip de-bugging.

However, protocol errors may well arise outside bus analyser testing. If the error has not been captured, it may at best be time-consuming to reproduce, or at worst non-repeatable.

Moreover, the very presence of the analyser on a bus can materially alter its physical characteristics—potentially to the extent that an error problem may no longer be perceived. Yet that error condition may re-occur when the analyser is disconnected.

Indeed, it may prove difficult even to attach an analyser to a bus, without violating prescribed physical bus or (bus/interface offshoot or branch) stub length maxima.

Certain bus signal lines, such as those designated 'BSY' or 'SEL', may be asserted by any peripheral following normal protocol—so the analyser cannot determine which peripheral is asserting bus signals in a fault condition.

Indeed, bus signal values perceived by an analyser on test mode reflect its (different) bus positioning—and so may not equate to that observed and interpreted by a (suspect) device.

Similarly, problems may arise on (customer) site, remote from diagnostic tools or expertise—and again it may not be possible to re-create them—with attendant customer dissatisfaction.

Thus, fault correction requires careful monitoring, analysis and interpretation. Errors can arise attendant physical device or inter-connection disturbances and mis-tracking of signal sequences, which can be independent or related.

SCSI is a particular example of a highly specific interface and bus protocol. SCSI configured peripheral devices include internal or external (in relation to a computer) hard disks, tape drives, CD-ROMS, printers, scanners etc.

SUMMARY OF THE INVENTION

According to one aspect of the invention, a bus and/or interface condition capture module, for integration or embedding in an interface between a command and data bus, such as a SCSI bus, and a computer peripheral device, is configured to serve as part of a bus analyser, the module comprising discrete memories for temporary storage of bus and/or interface signal condition and operational state or phase of the peripheral, for subsequent access, remote analysis and diagnosis.

The term analysis embraces interpretation and appraisal.

The memories may be configured as, say, RAM, or FIFO, with read-write modes adjusted accordingly.

The data captured includes both:

'correct', (protocol) conforming or compliant; and

'incorrect', non(protocol)-conforming, non-compliant, ie error or fault,

Signal Conditions and/or Operational States.

Such a capture module is conveniently incorporated in, or as an adjunct to, an interface ASIC, of a computer peripheral device, and configured to capture local bus and/or interface signal condition and operational state of the peripheral, for subsequent access, remote analysis and diagnosis.

In practice, the capture module could include a memory structured to store a history of bus signal transitions, and the assertion or de-assertion of signals, by the associated peripheral device, in whose interface the module is incorporated.

The invention embraces a peripheral device, with a bus interface incorporating a capture module.

The invention also embraces a computer, connected, through a bus, and peripheral interface, to a peripheral device, incorporating a bus and/or interface condition capture module.

According to yet another aspect of the invention, a method of bus and/or interface condition capture comprises the steps of separately monitoring criteria of bus and/or interface signal condition and operational state or phase of an associated peripheral device, and storing discretely changes in those criteria, for subsequent access, remote analysis and diagnosis.

According to a further aspect of the invention, a bespoke or dedicated bus and/or interface ASIC, is configured to incorporate, or work alongside, a localised bus and/or interface condition capture module, with discrete working memories, respectively for bus and/or interface signal condition and operational state or phase, of an attendant peripheral device, for onward relay to larger, longer terms storage, ready for subsequent access, remote analysis and diagnosis.

Both 'correct' or 'incorrect' signal levels or conditions and related or consequential peripheral operational states or phases could be recorded, continually—subject to occasional 'flushing' into a local RAM, under localised interface (eg ASIC) firmware control, ready for remote downloading or off-loading through bus ports, for devolved analysis and diagnosis.

If the peripheral is itself, or embodies, a large working memory, a portion could be allocated to the longer term (pre-diagnosis) retention of bus and/or interface condition and peripheral state.

It is envisaged that localisation—at a unique peripheral to bus interface—of such a capture module would provide a more detailed and intimate record of interface conditions and associated peripheral state, than available hitherto from conventional stand-alone bus analysers.

In the short term, this facilitates diagnosis of machines away from a test laboratory, such as in customer hands. It would also allow the separation or isolation of error conditions arising from unique circumstances of customer environment or usage—such as power supply spikes. In the longer term, the error log should assist in 'designing-out' conditions leading to errors, or achieving greater resilience to error conditions, such as spurious noise.

In practice, the capture module could be implemented within, or alongside, an existing bespoke interface ASIC, with minimal disturbance to existing functionality. Nevertheless, the potential benefits could be (favourably) out of all proportion to the relatively modest implementation 'overhead' penalty.

The capture section or module records both bus signal levels drive signals initiated by the interface ASIC. The capture module memory required is relatively modest, as it is continually flushed—say, to a remote store, for analysis—and refreshed with more current bus condition data.

In one variant, the capture module memory is conveniently configured to a FIFO (first in—first out) operational store inventory mode.

Overall, the capture module effectively functions as a localised capture section of a 'focussed' bus analyser.

Capture operation is conveniently under control of firmware, which could detect occurrence of protocol error or bus/device reset—whereupon the bus condition data could be read into local processor memory, for subsequent remote extraction, over the bus itself, or through a bespoke diagnostic port or emulator interface.

Localisation of protocol error condition capture—through an interface ASIC—obviates reliance upon failure mode repetition under contrived test conditions.

Absent this, full spectrum functional testing would otherwise entail a host of expensive analysers, in turn reliant upon statistical probabilities to catch failures for analysis.

With a peripheral device at a remote customer site, fault data from on-board capture modules can be downloaded electronically, using a software utility, to a diagnostic base. Without failure mode repetition, de-bugging is more readily undertaken.

The capture module stores a history of bus signal transitions, along with assertion/deassertion instances by the associated peripheral. This in turn facilitates isolation of peripherals generating protocol errors, and attendant de-bugging.

More particularly, the local capture module records 'actuality of perception and reaction' of the peripheral device under scrutiny—rather than a value perceived at a different bus position.

BRIEF DESCRIPTION OF THE DRAWINGS

There now follows a description of some particular embodiments of bus and/or interface capture modules according to the invention, by way of example only, with reference to the accompanying diagrammatic and schematic drawings.

These drawings reflect aspects of circuitry configuration and organisational logic layout and sequence, and in which.

DESCRIPTION OF THE INVENTION

Figure 1:
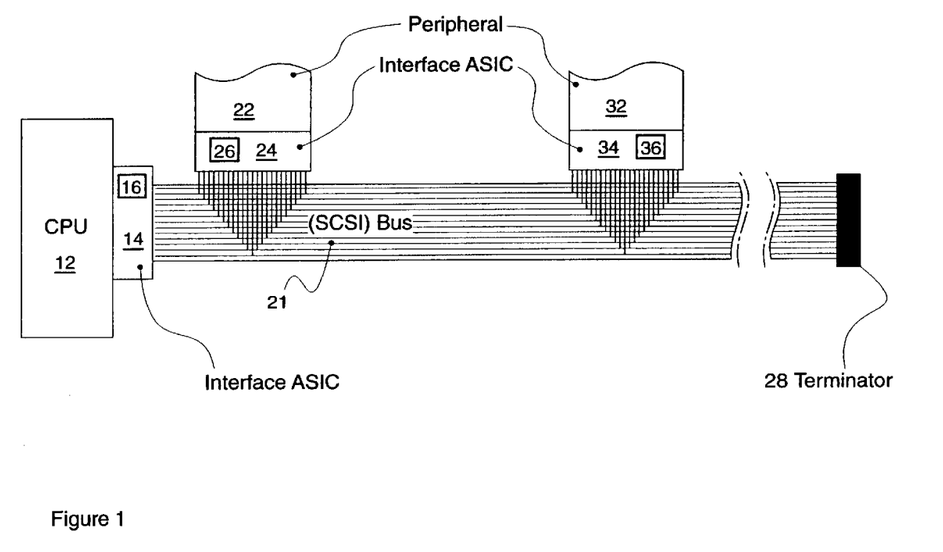
FIG. 1 shows a general layout of a (SCSI) bus supporting multiple peripheral devices, each with localised bus and/or interface capture modules incorporated in a respective peripheral interface ASIC.

Referring to the drawings, a bus 21—in this case configured to a SCSI protocol—supports various peripheral devices 22, 32, connected to the bus 21 through respective local interfaces 24, 34. For completeness, the bus is depicted with a matched end termination 28. There may also be provision (not shown) for supplementary peripheral device interconnection.

The bus 21 is driven by a centralised command processor or CPU 12, through a respective local interface 14. The peripheral interfaces 24, 34 incorporate dedicated or bespoke configured ASIC semiconductor devices.

The interface ASIC's incorporate, or are supplemented by, local bus and/or interface (condition) capture modules (26, 36). These capture modules (26, 36), preface or represent initial or prefacing stages of what are effectively local bus and/or interface analysers—even though an analytical or diagnostic facility need not itself be localised.

In principle, the extent of 'local intelligence' under firmware control admits of some variation—from raw data capture through to some screening or discrimination upon data capture and even preliminary interpretation, towards a more focussed or purposeful analysis and diagnosis.

Figure 2:
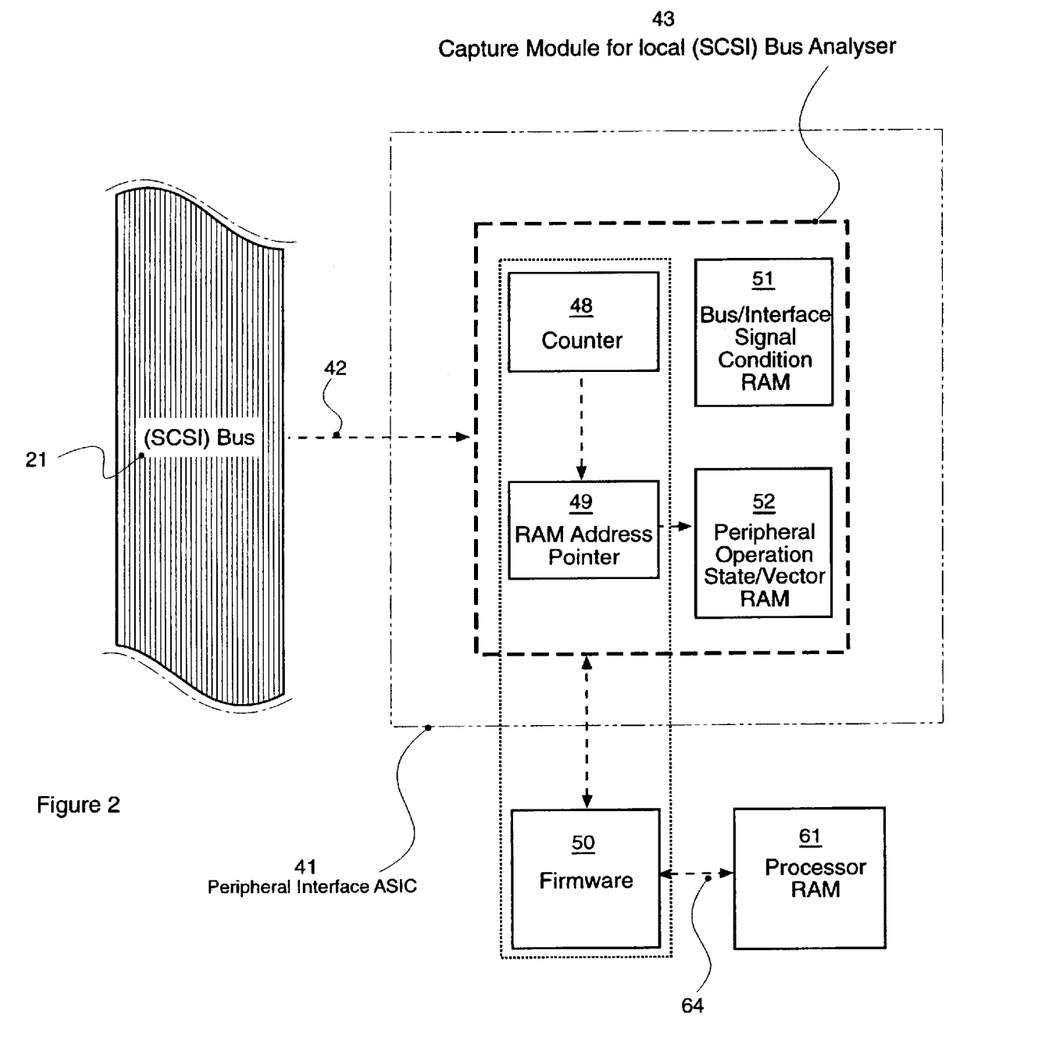
FIG. 2 shows a peripheral-to-bus interface detail of the FIG. 1 layout.

The CPU 12 interface 14 is also depicted with a dedicated ASIC and associated capture module 16. As shown in FIG. 2, a dedicated peripheral interface ASIC 41, addresses the bus 21 through a nominal link 42, and is configured with a localised capture module 43. The capture module 43 is effectively part of a local bus analyser.

Such capture has a dual capability, not available in the conventional bus analyser approach, namely:

local bus and/or interface signal condition; and
peripheral operational state or phase.

More particularly, the bus and/or interface signal condition is available in both read (driven) or write (driving) modes—that is when the peripheral is passive on the bus, or when the interface has 'asserted' or taken command over, and is temporarily driving the bus.

Intimate local knowledge can thereby be gained of which peripheral is asserting the bus when an error or fault arises—and which can be critical to diagnosis. This is more difficult to achieve remotely, as in a conventional bus analyser.

Duality of capture is effected through supplementary discrete memories 51, 52 integrated or embedded in, or as a supplement or adjunct to, the interface ASIC 41—and configured respectively for separate storage of bus and/or interface signal condition and peripheral operational state. In practice, the memories 51, 52 could be FIFO's, rather than RAM.

More particularly, a continual or selective record can be kept through the memories 51, 52 of successive changes in bus and/or interface signal condition and the operational phase of the associated peripheral 24, 34. This is achieved through repeated clock cycle writing.

Thus, in one operational variant, the memories 51, 52 are selectively addressable through a memory address pointer 49. The memory address pointer 49 is 'incremented' (ie moved or indexed to load a follow-on memory address) by a counter 48, which may in turn be placed under control of firmware 50.

Periodically, the firmware 50 can direct that the memories 51, 52 be 'flushed' into larger, longer term, remote storage, such as processor RAM 61. Alternatively, inherently larger capacity RAM configured memory could be loaded direct.

Figure 3:
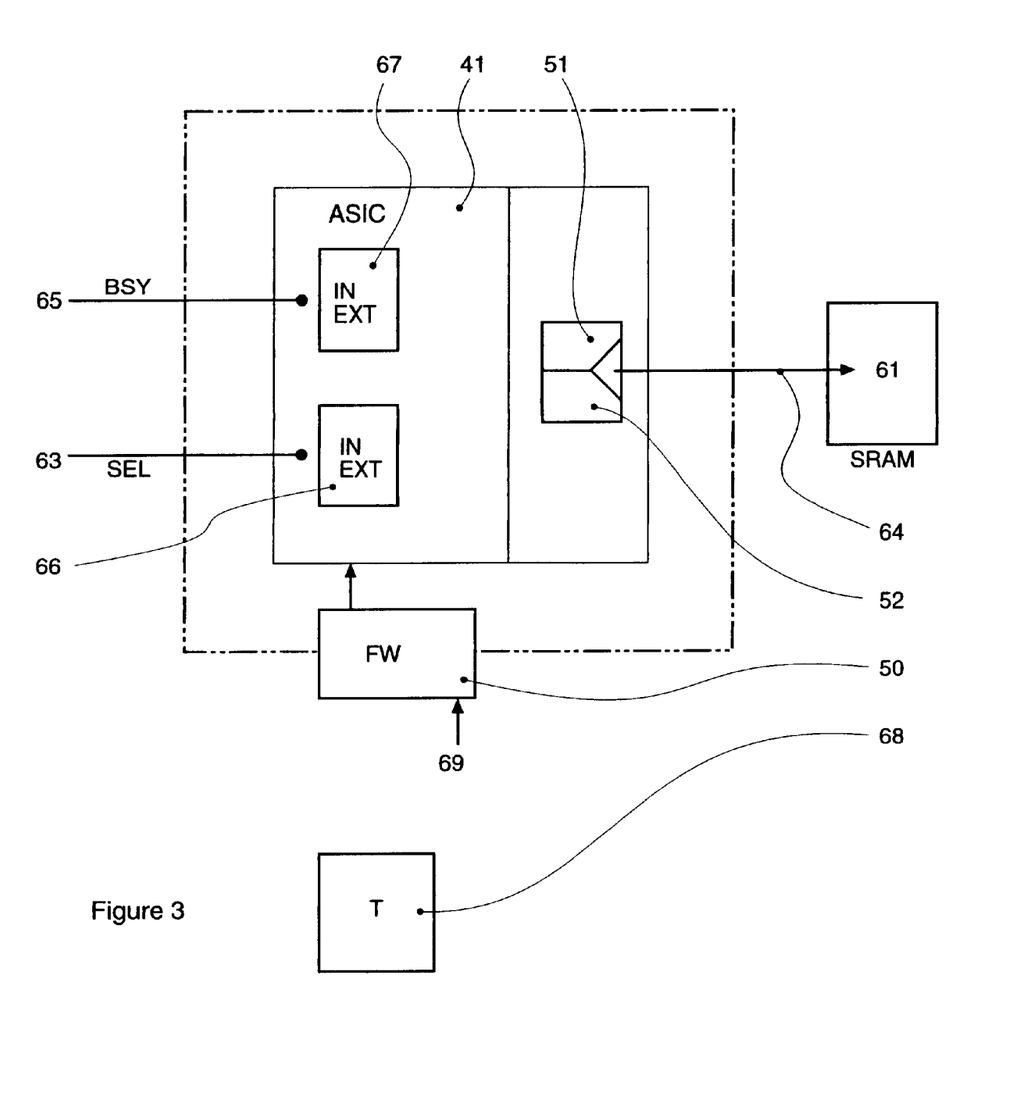
FIG. 3 shows a condensation of localised bus signal condition capture on certain individual bus lines.

The localisation of bus and/or interface signal condition capture can pay special regard to certain critical bus lines. FIG. 3 shows the localised bus and/or interface monitoring and signal condition capture of certain 'SEL' and 'BSY' bus lines, 63, 65—through respective input/output sections 66, 67 in the interface ASIC 41, under control of firmware 50.

Clock pulse signals 69 to the firmware 50 from a timer 68 can orchestrate stepping through an operational sequence. The contents of discrete stores 51, 52 could be flushed periodically, through a transfer line 64, to a remote, temporary SRAM 61.

Figure 4A:
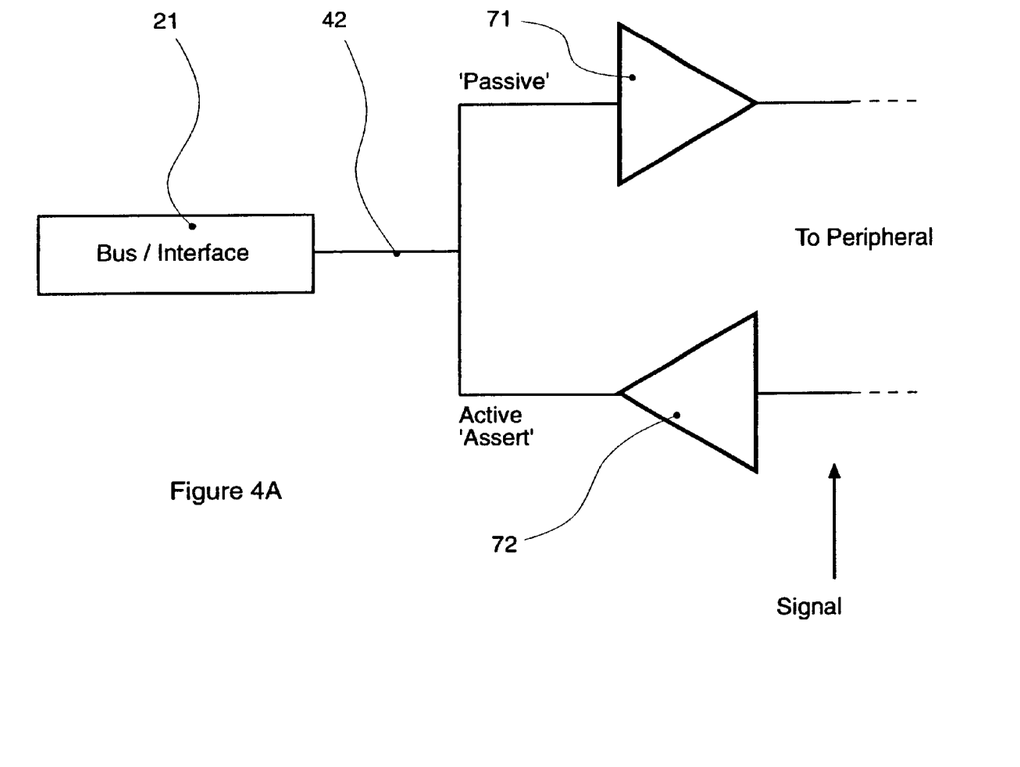
FIG. 4A shows dual peripheral driving and passive driven mode localised bus and/or interface signal condition signal capture.

FIG. 4A reflects bus and/or interface 21 interrogation or monitoring, for continual signal condition capture, through an input stage 71 and output or driver stage 72, with a common nodal connection to the bus link 42.

Figure 4B:
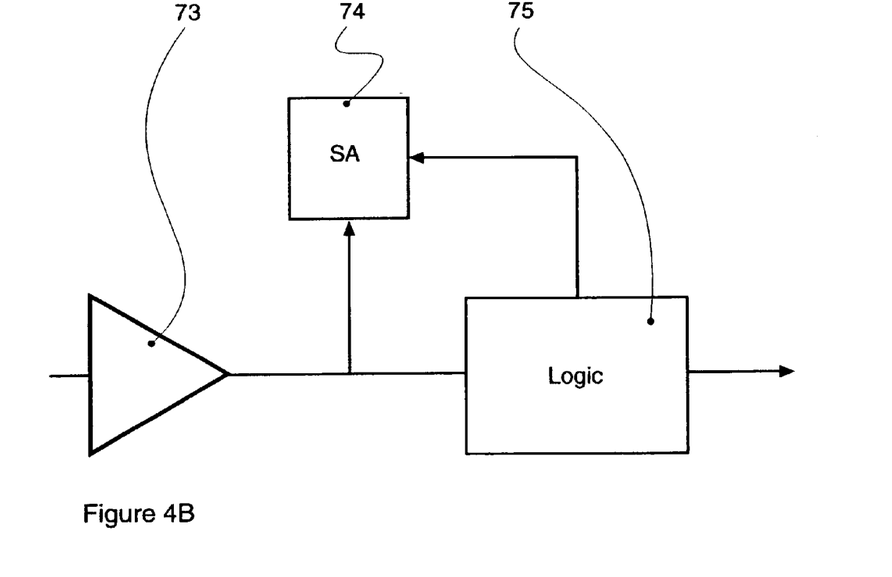
FIG. 4B shows a generalised bus analyser scheme.

FIG. 4B reflects a bus analyser 74 examining both signal condition from an input stage 73 and the state of operational logic 75.

Figure 5:
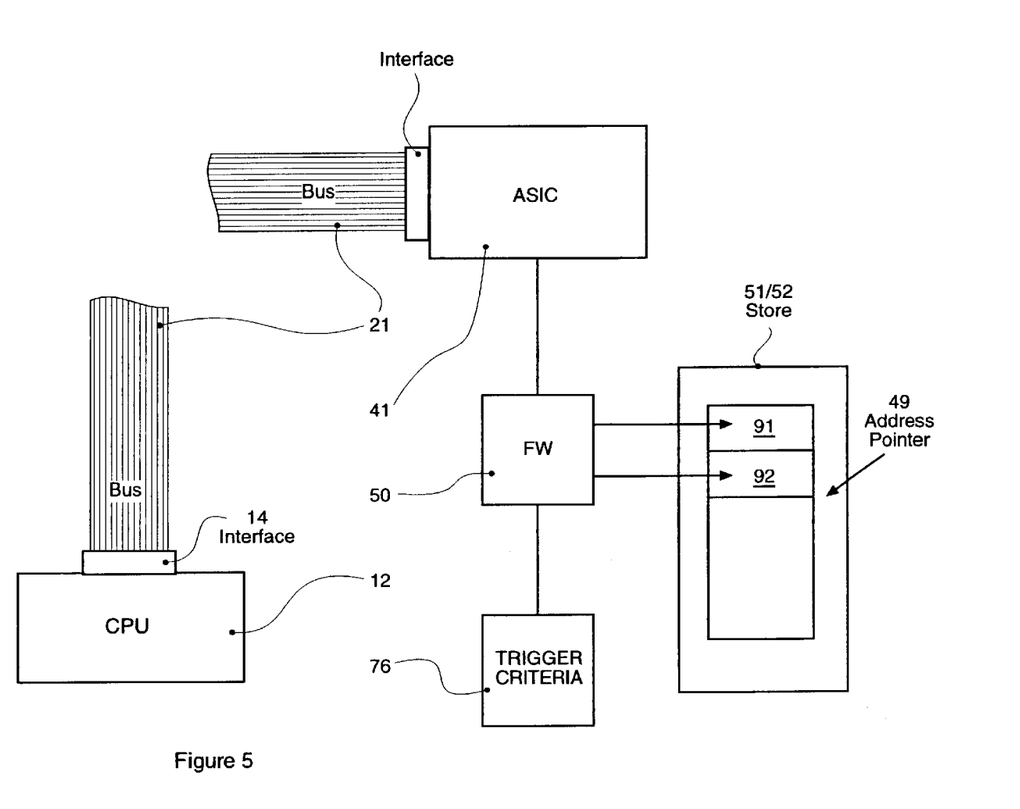
FIG. 5 shows firmware control of bus and/or interface signal condition and peripheral operational state capture and temporary storage.

FIG. 5 represents firmware 50 diverting successive interface ASIC 41 bus and/or interface signal conditions, to address locations 91, 92 in memories 51, 52, in accordance with comparative trigger criteria 76, paying attention to previous conditions.

Figure 6:
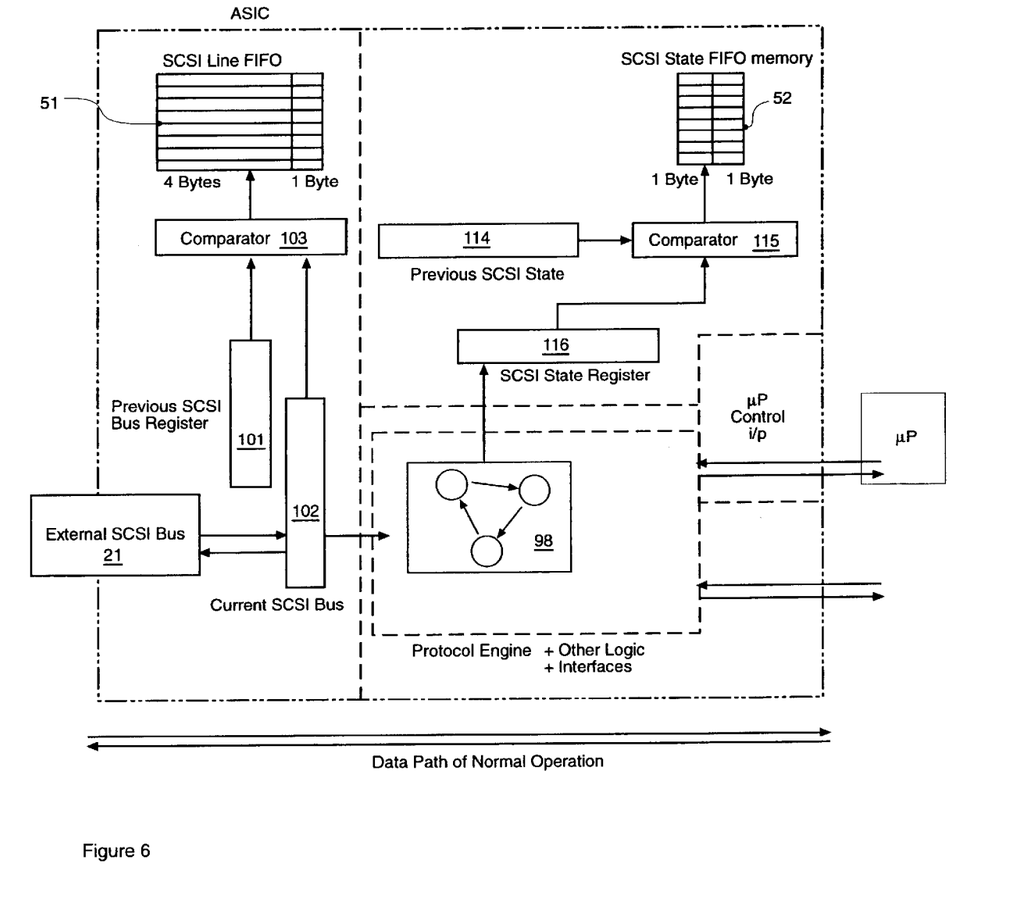
FIG. 6 shows a more developed scheme for bus and/or interface signal condition and operational state capture.

FIG. 6 shows a more developed bus and/or interface scheme in which a bus 21 instructs the operational state or phase of a peripheral engine 98.

Provision is made for hosting the 'normal' peripheral interfaces and attendant logic (not shown).

Current bus and/or interface signal condition is held in a (bus) register 102, for comparison, through a comparator 103, with a previous bus and/or interface signal condition held in another bus register 101.

Figure 7A:
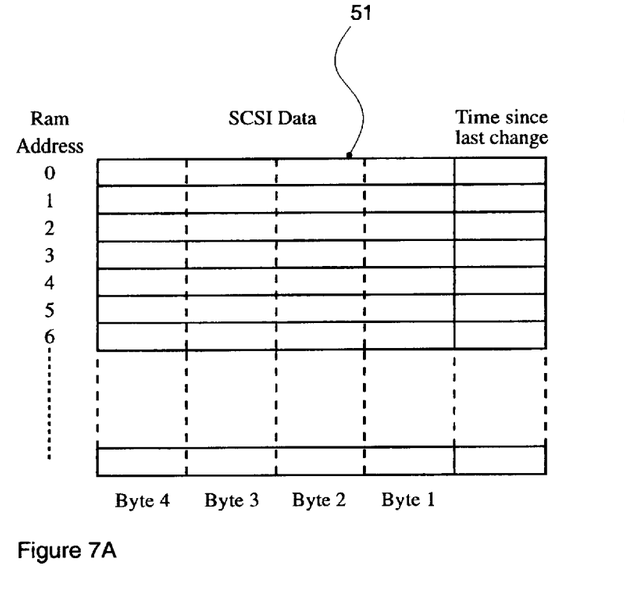
FIGS. 7A and 7B show capture module (RAM) memory address configurations, respectively for discrete storage of bus and/or interface signal condition and peripheral operational state or phase vector.

Any condition change is loaded into a memory 51, configured as described in relation to FIG. 7A. Similarly, current peripheral operational state or phase is loaded into a state register 116.

A comparator 115 compares the current peripheral state with a previous state, held in another state register 114. Any change is fed to a state memory 52, whose configuration is described in relation to FIG. 7B.

Figure 7B:
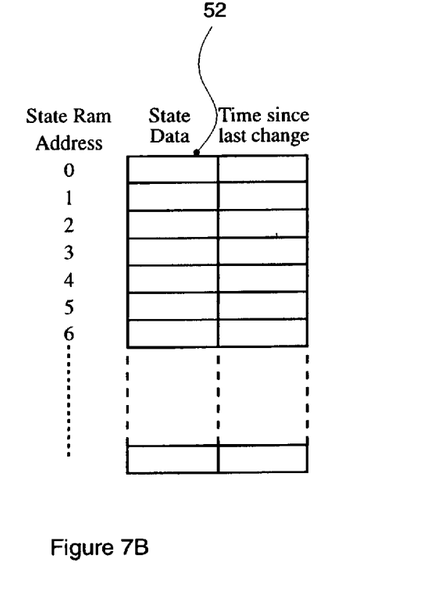
Figure 8A:
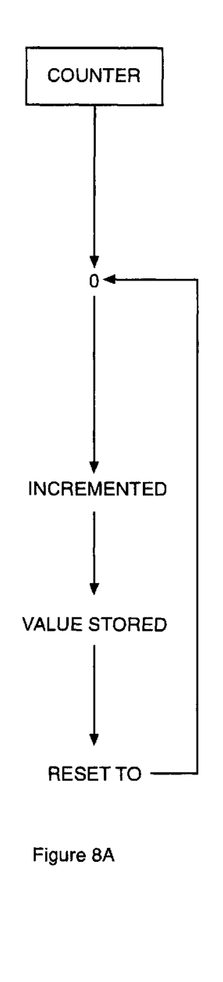
FIGS. 8A through 8E chart operational stages of the memory configurations of FIGS. 7A and 7B.
Figure 8B:
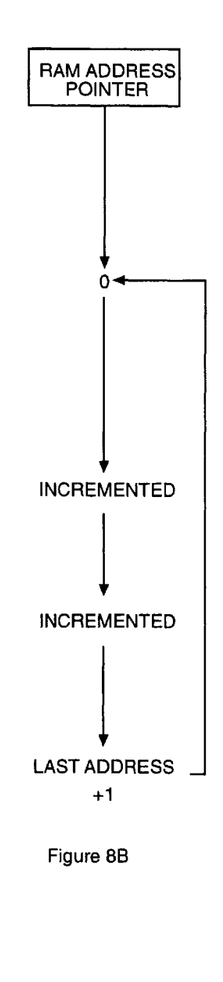
Figure 8C:
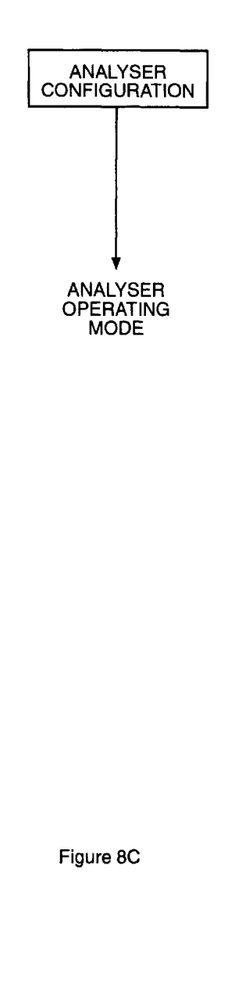
Figure 8D:
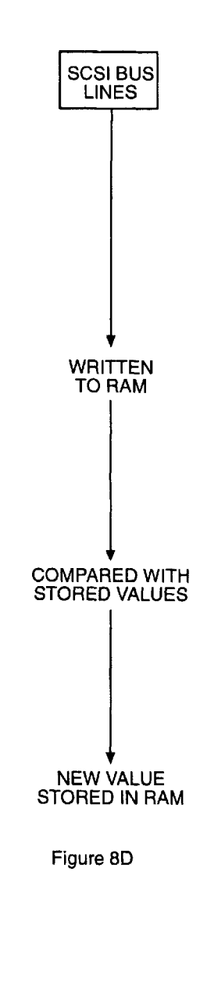
Figure 8E:
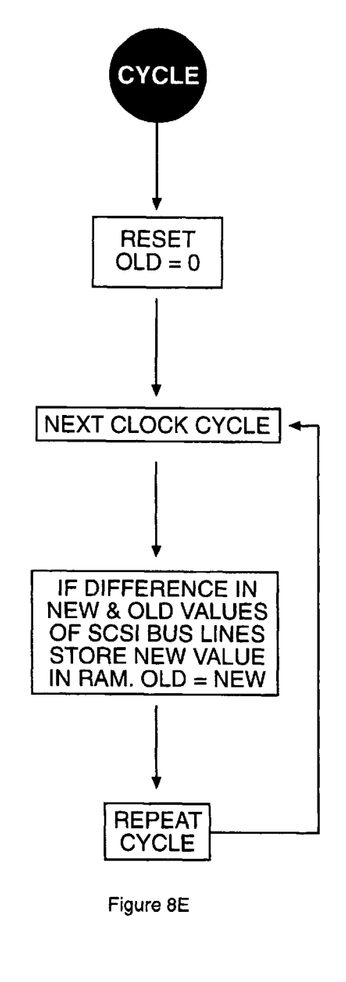

Referring to FIGS. 7A and 7B, adoption of separate storage 51, 52 respectively for bus and/or interface signal condition and peripheral operational state or phase reduces the overall memory size requirement, since each change in bus signals would otherwise also use an attendant 'state' store location. That is a peripheral operational state or phase change does not necessarily accompany every bus and/or interface signal condition change.

Whilst the memories 51, 52 operate independently, their operation is similar. Thus, the following description of operation of memory 51 is relevant to that of memory 52.

At the start of a monitoring sequence, a reset signal sets a counter 48 and RAM address pointer 49 to zero, with the analyser configuration set to analyser operating mode. The initial state of the (SCSI) bus is then written to the allocated RAM module 51, using the first address block 91, whereupon the address pointer 49 is incremented.

Every sampling period—for example a clock cycle—the (SCSI) bus lines are compared with the initially stored value and the counter 48 incremented. Should a difference arise between the new current value and the previous stored value, this new value is stored in the RAM 51, along with the value of the counter 48 at that instant. The counter 48 is then reset and the address pointer 49 incremented.

The bus line condition monitoring is a continuous operation, with the RAM location addresses 91, 92 etc. adopted successively in circulation, around the size of the FIFO storage mode—progressively, or incrementally overwriting the oldest data, so that the latest change(s) will always be available.

The analysis operation is halted to allow data reading from the memory contents. This in turn inhibits ongoing comparison and further writing to the RAM 61. The address pointer 49 is read to determine which address would have been used on the next write operation. Thus the oldest data is stored at that address and the firmware can read from the FIFO storage mode all entries form that point onwards, taking into account the (address) 'wrap around'.

This information is stored in processor RAM 61, ready for later extraction via, say, the (SCSI) bus itself, a diagnostic port, or emulation tools. Once stored the firmware can reset the analyser operation, without needing to reset the RAM address to a specific value before restarting. This operational mode is only needed with a RAM implementation of the memory.

Generally, with a FIFO (as opposed to, say, a RAM) implementation of memory, storage is halted while values are read out, one after another, from the same memory address. Upon each occasion data is loaded, the memory stack shuffles down, 'losing' the oldest data as it 'drops off' the stack capacity.

Similarly, as data is read from the 'top' of the FIFO stack, so an 'upwards' re-shuffling of data takes place. Thus, in the absence of a read out, the progressively oldest data is lost. Either implementation is feasible, or indeed a combination of the two.

The entire memory address block is not reset by the (SCSI) bus reset, although hardware and software resets will be effective. This is crucial operationally. The peripheral operational state or phase vector memory capture module 52 operates in a corresponding manner.

COMPONENT LIST

12 CPU
14 CPU interface ASIC
16 CPU interface ASIC capture module
21 (SCSI) bus
22 peripheral
24 peripheral bus and/or interface ASIC
26 peripheral bus and/or interface ASIC capture module
28 terminator
32 peripheral
34 peripheral bus and/or interface ASIC
36 peripheral bus and/or interface ASIC capture module
41 peripheral bus and/or interface ASIC
42 nominal bus and/or interface link
43 localised bus and/or interface capture module
48 counter
49 address pointer
50 firmware
51 memory-bus signal condition
52 memory-peripheral state
61 processor RAM
63 bus signal line 'SEL'
64 memory transfer
65 bus signal line 'BSY'
66 input/output device
67 input/output device
68 timer
69 timing pulse
71 input
72 output driver
73 input
74 bus analyser
75 operational logic
76 trigger
91 memory address
92 memory address
98 operational engine
101 bus condition register
102 bus condition register
103 bus condition comparator
114 operational state register
115 operational state comparator
116 operational state register

What is claimed is:

1. A bus interface incorporating a local capture module, configured as a part of an overall bus analyser, localised at a peripheral interface with a bus, and comprising discrete local memory, for bus and/or interface signal condition and a bus peripheral operational state, or phase.

2. A bus interface as claimed in claim 1, wherein the capture module is deployed with, or integrated as part of, a dedicated interface ASIC (Application Specific Integrated Circuit).

3. A bus interface as claimed in claim 1, including dedicated local peripheral interface memory, configured to store a progressive incremental history, of successive local bus signal levels, or level transitions, and the assertion or de-assertion of bus command authority, by an associated peripheral device, at whose interface the module is deployed, for periodic accumulated data transfer, over the bus, for subsequent remote analysis and diagnosis.

4. A computer peripheral device with a bus interface as claimed in claim 1.

5. A computer connected through a bus and the peripheral interface as claimed in claim 4.

6. A communications bus, with a peripheral device, configured for communication over the bus, to a prescribed architecture and operational protocol; an interface, connecting the peripheral to the bus, a signal capture module at the peripheral interface, a memory in the capture module a discrete location in the memory for bus and/or interface signal condition, another memory location for peripheral operational state, or phase, the memory being selectively accessible over the bus, for periodic transfer of accumulated data, for subsequent remote access, analysis and diagnosis.

7. A communications bus, as claimed in claim 6, incorporating a interface ASIC (Application Specific Integrated Circuit), with integrated local memory, configured for dedicated, incremental storage, discretely of successive bus and/or interface signal conditions, or transitions, and associated peripheral operational state, or phase.

* * * * *